US008774129B2

(12) United States Patent
De Benedittis et al.

(10) Patent No.: US 8,774,129 B2
(45) Date of Patent: Jul. 8, 2014

(54) MOBILE NETWORK OPTIMIZATION

(75) Inventors: Rossella De Benedittis, Ulm (DE); Hanns Juergen Schwarzbauer, Gröbenzell (DE); Uwe Herrmann, Ebersberg (DE); Maciej Pakulski, Czernica (PL); Patryk Pisowacki, Wroclaw (PL)

(73) Assignee: Nokia Siemens Networks Oy, Espoo (FI)

( * ) Notice: Subject to any disclaimer, the term of this patent is extended or adjusted under 35 U.S.C. 154(b) by 357 days.

(21) Appl. No.: 13/256,838

(22) PCT Filed: Mar. 16, 2009
(Under 37 CFR 1.47)

(86) PCT No.: PCT/EP2009/053094
§ 371 (c)(1),
(2), (4) Date: Feb. 13, 2012

(87) PCT Pub. No.: WO2010/105666
PCT Pub. Date: Sep. 23, 2010

(65) Prior Publication Data
US 2012/0250513 A1 Oct. 4, 2012

(51) Int. Cl.
*H04L 12/26* (2006.01)

(52) U.S. Cl.
USPC ............................................. 370/331

(58) Field of Classification Search
None
See application file for complete search history.

(56) References Cited

U.S. PATENT DOCUMENTS

| 7,098,637 | B2 | 8/2006 | Jauregui et al. | 323/268 |
| 2004/0123170 | A1 | 6/2004 | Tschanz et al. | 713/320 |
| 2007/0147377 | A1 | 6/2007 | Laroia et al. | 370/392 |
| 2007/0174641 | A1 | 7/2007 | Cornwell et al. | 713/300 |
| 2008/0247361 | A1* | 10/2008 | Jung et al. | 370/331 |
| 2010/0067503 | A1 | 3/2010 | Premec | 370/338 |
| 2010/0323736 | A1* | 12/2010 | Fischer et al. | 455/509 |
| 2011/0032898 | A1* | 2/2011 | Kazmi et al. | 370/329 |

FOREIGN PATENT DOCUMENTS

| CN | 1588270 A | 3/2005 |
| CN | 1598733 A | 3/2005 |
| EP | 1 940 093 A1 | 7/2008 |

(Continued)

OTHER PUBLICATIONS

3GPP TS 25.423 V8.3.0 (Dec. 2008), 3$^{rd}$ Generation Partnership Project; Technical Specification Group Radio Access Network; UTRAN Iur Interface RNSAP Signalling (Release 8), (960 pages).

(Continued)

*Primary Examiner* — Raj Jain
(74) *Attorney, Agent, or Firm* — Harrington & Smith

(57) ABSTRACT

It is described a mobile network with a first network node and a second network node, the mobile network providing a user plane for transporting transmission packets, which contain user data, and a further network layer plane different from the user plane. A method of operating the first network node includes sending an information element to the second network node via a network layer protocol of the further network layer plane wherein the information element indicates optimizing capabilities of the first network node or of a other network node of the mobile network of processing an optimized transmission packet. A method of operating a second network node includes receiving the information element from the first network node via a network layer protocol of the further network layer plane, and processing the information element.

20 Claims, 4 Drawing Sheets

(56) References Cited

FOREIGN PATENT DOCUMENTS

| KR | 20080085038 A | 9/2008 |
|---|---|---|
| KR | 20080087850 A | 10/2008 |
| WO | WO-2007/075671 A1 | 7/2007 |

OTHER PUBLICATIONS

3GPP TS 25.467 V8.0.0 (Dec. 2008), 3$^{rd}$ Generation Partnership Project; Technical Specification Group Radio Access Network; UTRAN Architecture for 3G Home NodeB; Stage 2 (Release 8), (22 pages).

3GPP TR 29.814 V7.1.0 (Jul. 2006), 3$^{rd}$ Generation Partnership Project; Technical Specification Group Core Networks and Terminals Feasibility Study on Bandwidth Savings at Nb Interface with IP Transport (Release 7), (19 pages).

3GPP TS 29.414 V8.2.0 (Dec. 2008), 3$^{rd}$ Generation Partnership Project; Technical Specification Group Core Network and Terminals; Core Network Nb data Transport and Transport Signalling (Release 8), (24 pages).

3GPP TS 25.469 V8.1.0 (Dec. 2008), 3$^{rd}$ Generation Partnership Project; Technical Specification Group Radio Access Network; UTRAN Iuh Interface Home Node B Application Part (HNBAP) Signalling (Release 8), (56 pages).

3GPP TS 25.415 V8.0.0 (Dec. 2008), 3$^{rd}$ Generation Partnership Project; Technical Specification Group Radio Access Network; UTRAN Iu Interface User Plane Protocols (Release 8), (63 pages).

3GPP TS 36.413 V8.1.0 (Mar. 2008), 3$^{rd}$ Generation Partnership Project; Technical Specification Group Radio Access Network; Evolved Universal Terrestrial Access Network (E-UTRAN); SI Application Protocol (SIAP) (Release 8), (149 pages).

3GPP TS 25.413 V8.1.0 (Dec. 2008), 3$^{rd}$ Generation Partnership Project; Technical Specification Group Radio Access Network; UTRAN Iu Interface Radio Access Network Application Part (RANAP) Signalling (Release 8), (380 pages).

3GPP TS 25.433 V8.3.0 (Dec. 2008), 3$^{rd}$ Generation Partnership Project; Technical Specification Group Radio Access Network; UTRAN Iub Interface Node B Application Part (NBAP) Signalling (Release 8), (1105 pages).

Broadband Forum Technical Report; "TR-069, CPE WAN Management Protocol v1.1"; Dec. 2007; whole document (138 pages) ; The Broadband Forum.

Broadband Forum Technical Report; "TR-196, Femto Access Point Service Data Model"; Apr. 2009; whole document (131 pages); The Broadband Forum.

Schulzrinne, H. et al.; "RTP: A Transport Protocol for Real-Time Applications"; Jul. 2003; whole document (105 pages); network Working Group.

Broadband Forum Working Text; "Draft, wT-196, Femto Access Point Service Data Model"; Feb. 2009; whole document (103 pages); The Broadband Forum.

\* cited by examiner

| NoC | 0 | 1 | 2 | 3 | 4 | 5 |
|---|---|---|---|---|---|---|
| Bw (kbps) | 0 | 84.8 | 169.6 | 254.4 | 339.2 | 424.0 |

| NoC | 0 | 1 | 2 | 3 | 4 | 5 |
|---|---|---|---|---|---|---|
| Bw (kbps) | 0 | 84.8 | 106.0 | 127.2 | 148.4 | 169.6 |

| NoC | 0 | 1 | 2 | 3 | 4 | 5 |
|---|---|---|---|---|---|---|
| Bw (kbps) | 0 | 84.8 | 106.0 | 127.2 | 148.4 | 148.4 |

FIG 5

| IE/Group Name | Presence | Range | IE type and reference | Semantics description |
|---|---|---|---|---|
| Choice Multiplexing Capability | | | | |
| > Mux Announcement | | | enumerated (Reception without Header Compression; Reception with Header Compression; Transmission without Header Compression; Transmission with Header Compression; Transmission&Reception without Header Compression; Transmission & Reception with Header Compression) | This field is used for announcing to the peer which kind of multiplexing capabilities are supported by the sender. It is assumed that multiplexing can be activated in both or only one direction, with or without header compression. |
| >> Common Multiplexing port | O | | OCTET STRING (4) | This field indicates the port assigned by the sender for the multiplexed data stream. This can be the UDP port of the Common Header in case of a RTP multiplexing method. |
| > Mux Activation | | | Enumerated (Start Reception, Start Transmission; Start Reception&Transmission; Stop Reception; Stop Transmission; Stop Reception&Transmission) | It is used for requesting the activation or deactivation of multiplexing. It is assumed that activation/deactivation can be ordered per direction. |
| >> Common Multiplexing Port | M | | OCTET STRING (4) | This field indicates the port assigned by the sender for the multiplexed data stream. This can be the UDP port of the Common Header in case RTP multiplexing method. |

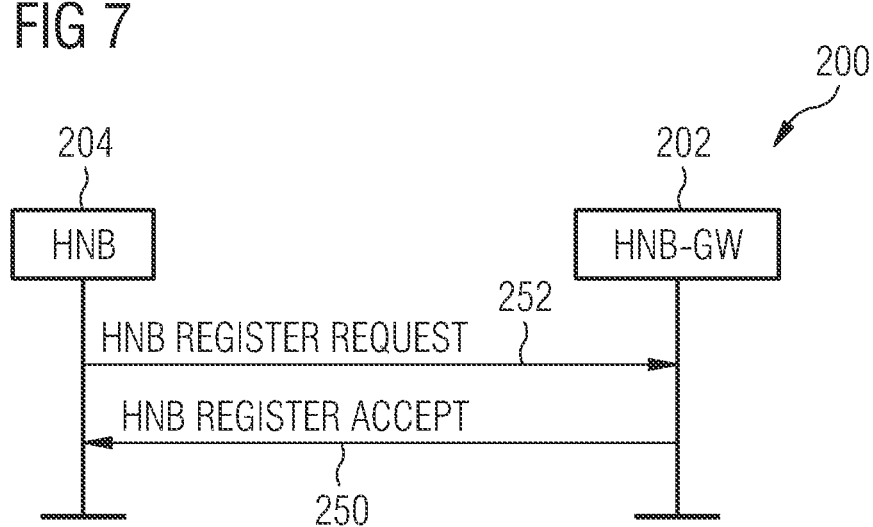
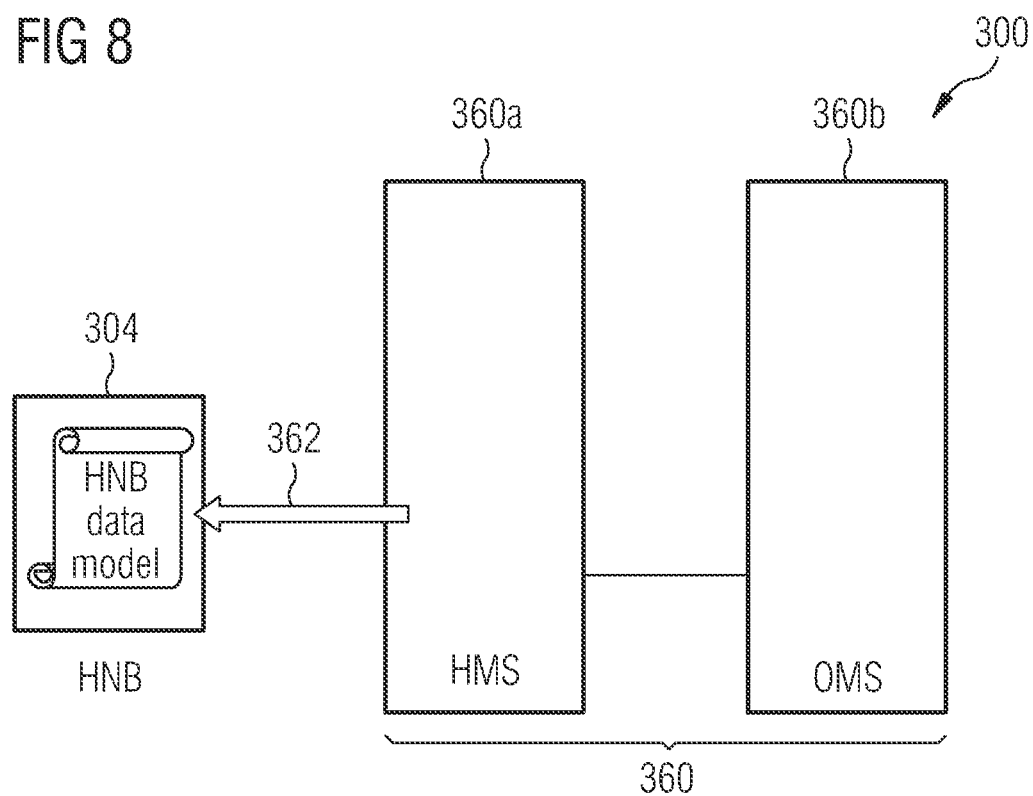

MOBILE NETWORK OPTIMIZATION

FIELD OF INVENTION

The present invention relates to the field of packet based wireless communication.

ART BACKGROUND

For mobile networks a migration towards an IP transport is considered e.g. for reducing expenditures for operation and deployment. However, for short packets the overhead can fairly exceeded the data payload. In order to minimize the overhead and to optimize the transport resources, multiplexing of small data packets, i.e. small packet data units (PDUs) into a single IP packet has been proposed (e.g. third generation partnership project (3GPP) documents TR 29.814 V7.1.0. (2007 June) and 3GPP TS 29.414 V8.2.0 (2008 December)) using PDU multiplexing negotiation via Iu user plane protocol or via Real time Transport Control Protocol (RTCP protocol) for the Nb interface.

The known solutions offer the advantage that multiplexing negotiation is allowed to be performed in-band, i.e. the involved entities, e.g. a media gateway (MGW), are directly informed of when and how the multiplexing feature is activated. Herein a MGW cooperates with the MGCF (Media Gateway Control Function) in order to support e.g. working between IP based transport networks and the circuit switched PSTN (Public Switched Telephone Network) or PLMN (Public Land Mobile Network) domains. The MGW will translate media arriving within a TDM based timeslot to an RTP (Real time Transport Protocol) stream or vice versa.

In view of the above-described situation, there still exists a need for an improved technique that enables to efficiently negotiate optimization techniques to be used in communication between two network nodes of a mobile network.

SUMMARY OF THE INVENTION

This need may be met by the subject matter according to the independent claims. Advantageous embodiments of the herein disclosed subject matter are described by the dependent claims.

According to a first aspect of the herein disclosed subject matter there is provided a method of operating a first network node of a mobile network, the mobile network providing a user plane for transporting transmission packets, which contain user data, and at least one additional further network layer plane different from the user plane. For example, according to an embodiment, an additional network layer plane is provided.

The method according to the first aspect comprises sending an (optimization capability) information element to a second network node via a network layer protocol of the further network layer plane, wherein the information element indicates optimizing capabilities of a network node of the mobile network, i.e. the capability of this network node of processing an optimized transmission packet.

According to an embodiment the network node, of which the optimizing capability is indicated by the information element, is the first network node. According to another embodiment, the information element indicates optimizing capability of a third network of the mobile network, different from the first network node. In an example of this embodiment, the first network node may be an operation and maintenance subsystem. According to a further embodiment, the network element indicates optimizing capabilities of two or more network nodes of the mobile network. These two or more network nodes include the first network node in one embodiment.

The method according to the first aspect allows for numerous new applications and embodiments of indicating optimizing capabilities of the first network node.

Herein, the information element may be of any suitable kind, and may be, e.g., a flag, an entry in a field of a message structure, etc. According to an embodiment, the optimized transmission packet is an optimized IP packet.

Herein, a network node may be any network node of a mobile network, a base station such as e.g. a home node-B (HNB) of a femto network or a node-B (NB) of a UMTS radio access network (UTRAN), a home node-B gateway (HNB-GW), a radio network controller (RNC), a mobile switching center (MSC), or a serving GPRS support node (SGSN) which keeps track of the location of an individual mobile station (MS) and performs security functions and access control of a GSM network or e.g. SGSN in a UMTS network, where it connects to the RNC (Radio Network Controller) over a Iu-PS interface. The network nodes may also well be an evolved enhanced home node-B (HeNB) or, an evolved enhanced node-B (eNB) of an evolved UMTS radio access network (eUTRAN), a serving gateway (S-GTW) or the Mobility Management Entity (MME) of an evolved packet core (EPC)enhanced UTRAN (eUTRAN) network.

According to an embodiment, the information element indicates the capability of the first network node of processing an optimized transmission packet sent by the second network node.

According to a further embodiment, the optimizing capabilities include multiplexing capabilities of the first network node of processing an optimized transmission packet containing different user data packets multiplexed into the optimized transmission packet. However, user data packet multiplexing (PDU multiplexing) is only one embodiment of an optimizing capability. Other embodiments include optimizing capabilities like e.g. header compression. User data packets may be e.g. real time transport protocol (RTP) frames. The Real time Transport Protocol is an Internet protocol standard that defines a way for applications to transport real time media. RTP provides a mechanism for ensuring its payload is delivered by using of timestamps, which are applied to every RTP packet, thereby providing a jitter free and in sequence transport.

According to a still further embodiment, the sending of an information element to a second network node via a network layer protocol of the further network layer plane comprises sending an information element to the second network node independently from a connection setup between the second network node and the first network node. A connection setup may be for example a call setup in one embodiment. According to another embodiment, the sending of the information element is independent (unrelated) from call-setup signalling. This allows for a flexible announcement of the optimization capabilities of the first network node.

According to a further embodiment, the method according to the first aspect comprises sending to the second network node a register accept message in response to a register request for connecting the second network node to the network. According to a further embodiment, the information element is contained in the register accept message.

The register accept message may be any register accept message by which the registration request of the second network node is accepted. According to an exemplary embodiment, the register accept message is in accordance with 3GPP TS25.469.

According to a further embodiment, the method according to the first aspect comprises sending to the second network node a configuration message containing configuration parameters for the second node wherein the information element is contained in the configuration message. Such an embodiment has the advantage that the announcement of optimization capabilities of the first network node is transmitted to the second network node in the course of configuration of the second network node. Further, according to other embodiments the information element may indicate optimization capabilities of at least one third network node. In such an embodiment, the first network node may collect and store optimization capabilities of the further, third network nodes and may forward these optimization capabilities to the second network node in the course of connection of the second network node to the mobile network.

The configuration message may be any configuration message by which the second network node is configured. According to an exemplary embodiment, the configuration message is a configuration message based on the CPE WAN management protocol (CWMP) of broadband forum TR-069 protocol.

According to an embodiment the method according to the first aspect further comprises sending to the second network node a radio access network application part (RANAP) message, e.g. for a UTRAN, or an S1 application protocol (S1AP) message for a eUTRAN, wherein the information element is contained in a field of the RANAP or S1AP message. In an exemplary embodiment, the radio access network application part message is in accordance with 3GPP TS 25.413 V8.1.0 (2008 December). According to a further embodiment, the information element is sent to the second network node via an Iu interface linking the RNC (Radio Network Controller) with either a MSC (Mobile Switching Centre) or a SGSN (Serving GPRS Support Node). According to an embodiment, the Iu interface is of the kind defined in 3GPP TS 25.413 V8.1.0 (2008 December). However, in other embodiments the radio access network application part message is configured differently, only setting up a RAB (Radio Access Bearer) between a CN (Core Network) and a RNC (Radio Network Controller).

In another exemplary embodiment, the S1 application protocol complies with 3GPP TS 36.413 V8.1.0 (2008 December). According to a further embodiment, the information element is sent to the second network node via S1 interface linking the H(e)NB to the MME.

According to an embodiment, the S1 interface is of the kind defined in 3GPP TS 36.413 V8.1.0 (2008 December).

In various embodiments, the radio access network application part message may be, for example, one of a RAB assignment request, a relocation request in the case that the first network node is the initiator, a RAB assignment response, a relocation request acknowledge in the case that the first network node is the responder, etc.

According to other embodiments, the S1 application protocol message may be for example an initial context setup request, an E-RAB setup request, a handover request in the case that the first network node is the initiator, an initial context setup response, an E-RAB setup response, a handover request acknowledge in the case that the first network node is the responder.

According to a further embodiment, the method according to the first aspect comprises sending to the second network node a control message, wherein the information element is contained in the control message.

The control message may be any control message configured for controlling an entity or a functionality of the mobile network. According to an embodiment, the control message is a radio network layer related control message, examples of which include e.g. messages sent over the application protocol used between a mobile network controller and a base station, e.g. between a radio network controller (RNC) and a node-B of a UTRAN network. For instance, in an embodiment, the control message is a message sent via a node-B application protocol (NBAP) which is used to configure and manage the nodeB and to setup channels on the Iub and Uu interfaces. According to another embodiment, the control message is a message sent via a mobile network signalling interface, e.g. a radio network subsystem application part (RNSAP) which is the radio network signalling over the Iur interface in a UMTS system. RNSAP is defined in the 3GPP. Examples of a control message include e.g. a radio link setup request, a radio link reconfiguration request, etc.);

According to a second aspect of the herein disclosed subject matter, a method of operating a second network node of a mobile network is provided wherein the mobile network provides a user plane for transporting transmission packets, which contain user data, and a further network layer plane different from the user plane. The method according to the second aspect comprises receiving an information element from a first network node via a network layer protocol of the further network layer plane. Further, the method according to the second aspect comprises processing the information element, i.e. second network node is capable of taking into account the information element. The information element indicates an optimizing capability of the first network node of processing an optimized transmission packet. The information element may be configured in accordance with any embodiment of the first aspect.

In the second aspect and its embodiments, the (second) network node may be any network node of a mobile network, e.g. a network node as defined within the first aspect and its embodiments.

An optimizing capability may be any capability for transmission optimizing, e.g. multiplexing, compression, header compression, etc. The first network node according to the second aspect may be configured according to any embodiment of the first aspect. Also the second network node according to the second aspect may be configured according to any embodiment of the first aspect.

According to an embodiment of the second aspect, the optimizing capability includes a multiplexing capability of the first network node of processing an optimized transmission packet containing different user data packets (e.g. RTP frames) multiplexed into the optimized transmission packet.

According to an embodiment of the second aspect, receiving an information element from a first network node via a network layer protocol of the further network layer plane comprises receiving the information element from the first network node independently from a connection setup (e.g. independently from a call setup) between the second network node and the first network node. A connection setup may be for example a call setup in one embodiment. According to another embodiment, receiving of the information element is independent (unrelated) from call-setup signalling. This allows for a flexible announcement of the optimization capabilities of the first network node.

According to a further embodiment, the method according to the second aspect further comprises sending an optimization request message to the first network node, the optimization request message requesting (a) the first network node to activate optimization, i.e. to send to the second network node respectively optimized transmission packets. For example, according to an embodiment, an optimization request message may be or may include an optimization-choice information element including the optimization request, e.g. a respective value in an optimization activation field of the optimization choice information element. An example of an optimization activation field is for example a multiplex (mux) activation field.

According to other embodiments, optimization in the first network node is activated by the second network node by sending an optimized transmission packed to the first network node.

According to an embodiment of the second aspect, the method comprises sending to the first network node a resource assignment request message, the resource assignment request message requesting the assignment of a respective resource for transmittance of transmission packets, wherein the resource assignment request message includes an optimization-choice information element (e.g. Mux activation choice field) requesting optimization for the requested resource.

According to an embodiment, a resource assignment request message is an assignment request for a radio access bearer (RAB assignment request or Initial Context Setup Request or E-RAB setup request).

According to a further embodiment, sending the resource assignment request message to the first network node is performed after the above mentioned optimization request message.

According to a further embodiment of the second aspect, the method comprises sending to the first network node a resource modification request message, the resource modification request message requesting the modification of a respective target resource, wherein the resource assignment request message includes an optimization-choice information element requesting deactivation of optimization for the target resource of the resource modification request message.

An example of a resource modification request message is e.g. a RAB assignment request or a UE context modification request or a E-RAB modify request.

According to an embodiment, the optimization-choice information element comprises or consists of a mux deactivation choice field. According to a further embodiment, the optimization-choice information element comprises or consists of a mux activation/deactivation choice field.

According to a further embodiment, the sending of the resource modification request message to the first network node is performed after the above mentioned optimization request message.

It should be understood that the optimization-choice information element according to embodiments of the herein disclosed subject matter may include one or more optimization activation fields, e.g. one for each supported optimization.

According to an embodiment of the first aspect or of the sec- and aspect, the network layer protocol is a signalling protocol.

According to a further embodiment of the first aspect or of the second aspect, the network layer protocol is an administration protocol, e.g. a broadband forum TR-069 protocol.

According to a further embodiment of the first aspect or of the second aspect, the further network layer plane is a control plane.

According to a further embodiment of the first aspect or of the second aspect, the further network layer plane is an operation & maintenance plane.

According to further embodiments of the first aspect or of the second aspect, a herein disclosed information element (e.g. an optimization capability information element and/or an optimization activation information element) comprises a port specification. The port specification specifies, of the first network node, the port for receiving the optimized transmission packet. Hence, the port specification of an information element allows the second network node to send an optimized transmission packet to the referenced port of the first network node.

According to a further embodiment of the first aspect or of the second aspect, one of the first network node and the second network node is a home node B gateway of a femtocell network and the other is a home node B of the femtocell network. For example, according to an embodiment the first network node is a home node B gateway (HNB gateway) and the second network node is a home node B (HNB). According to another embodiment, the first network node is a home node B (HNB) and the second network node is a home node B gateway (HNB gateway).

According to further embodiments, the network nodes are peers, merging the roles of clients and servers.

Generally, it should be understood that since herein the terms "first network node" and "second network node" are only used for allowing to reference two different network nodes, one single network node may include features of both, the first aspect and the second aspect. For example, if optimization is supported/activated in uplink and downlink direction, one network node may be a first network node in view of an uplink transmission and may be a second network node in view of a downlink transmission. However, according to other embodiments optimization is supported/activated only in one direction (uplink or downlink).

Another embodiment of the herein disclosed subject matter relates to a method to exchange information related to a more efficient user data transmission between two nodes with (e)RAN interfaces (eg., Iu, Iur, Iub, Iu-h, S1 (eg HNB, HNB-GW, base station controller RNC, base station NB, eNB, MSC/SGSN/MME))

where there is a radio user plane which transports user data between both nodes and where there is a radio signalling plane which transports signalling data (of each user connection) between both nodes, optionally including an error correction protocol to guarantee correct and in-sequence delivery (eg message loss detection and message repetition protocol), and where the radio user plane transmits separately to the radio signalling plane and where each node reports its own user data optimisation capabilities and parameters in a way that after a 2-way exchange, a common set of optimised transmission capabilities are known to each node including the parameters how to operate in such an optimised way.

An information element related to a more efficient, optimized user data transmission may comprise indications of at least one of 1) support of packet multiplexing capability may be comprising the direction indication receive or transmit,
2) of support for user data header compression,
3) of operational parameters to use if multiplexing is applied and which kind of multiplexing is used, e.g. concatenation of user data packets or header compression of user data or both or transport layer parameters e.g. UDP port number for UPD protocol transmissions.

An information element might be exchanged at connection setup of both nodes (user data transmission capabilities are node capabilities) or during user connection setup between both nodes (beginning of call) or during provisioning from management system.

Activation or deactivation of transmission optimised operation is decided by sender and may be indicated to peer node on signalling channel during user connection setup or may be started by transmitting user data using the transmission parameters for optimised transmission.

An originating node (first node) (eg, HNB, HeNB, HNB-GW, NB, eNB, RNC) transmits its supported transmission optimisation capabilities or related operational parameters to the second node (e.g. peer node) via a signalling channel (eg Iu, Iur, Iub, Iu-h, S1).

The second node (eg HNB-GW, RNC, MSC/SGSN, MME) receives information on supported transmission optimisation capabilities of originating node, compares those to its own capabilities and transmits back its own transmission optimisation capabilities matching to the received capabilities or related operational parameters.

A RAN node may receive from a management system the transmission optimisation capabilities or parameters (eg., using TR-069 interface) avoiding individual capability or parameter exchange with each connected node.

According to a third aspect of the herein disclosed subject matter, a network node is provided, the network node comprising a control unit configured to carry out the method according to at least one of the first aspect and the second aspect or embodiments thereof. Hence the network node may include any feature or any combination of the features disclosed above or disclosed in the detailed description. It should be understood that the term "network node" embraces both, the first network node and the second network node as defined in the first aspect, the second aspect or embodiments thereof. For example, the "network node" according to the third aspect may be any network node of a mobile network, e.g. a network node as defined within the first aspect and embodiments thereof.

According to a fourth aspect, a computer program for processing a physical object, namely at least one of the information elements referenced in the first and second aspects or an embodiment thereof, is provided. The computer program, when being executed by a data processor, is adapted for controlling one or more methods as set forth in the first aspect, the second aspect and embodiments thereof.

In the following there will be described exemplary embodiments of the subject matter disclosed herein with reference to a method of operating a first network node and a method of operating a second network node. It has to be pointed out that of course any combination of features relating to different aspects of the herein disclosed subject matter is also possible. For example, some embodiments are described with reference to a first node sending particular elements, e.g. information elements while other embodiment are described with reference to a second node receiving particular elements, e.g. information elements. It should be understood that according to further embodiments any functionality of the first node has its respective counterpart in the second node. For instance, a capability of the first node of sending a particular element implicitly discloses, according to such embodiments, a respective functionality of the second node of receiving the particular element.

Further, some embodiments are described with reference to apparatus type claims whereas other embodiments are described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims is considered to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 5 shows an example of a multiplexing capability information element coding according to embodiments of the herein disclosed subject matter.

FIG. 7 shows a registration procedure of a home nodeB at a home nodeB gateway according to embodiments of the herein disclosed subject matter.

FIG. 8 illustrates the use of a data object model according to embodiments of the herein disclosed subject matter.

DETAILED DESCRIPTION

Figures 1, 2, 3, 4:
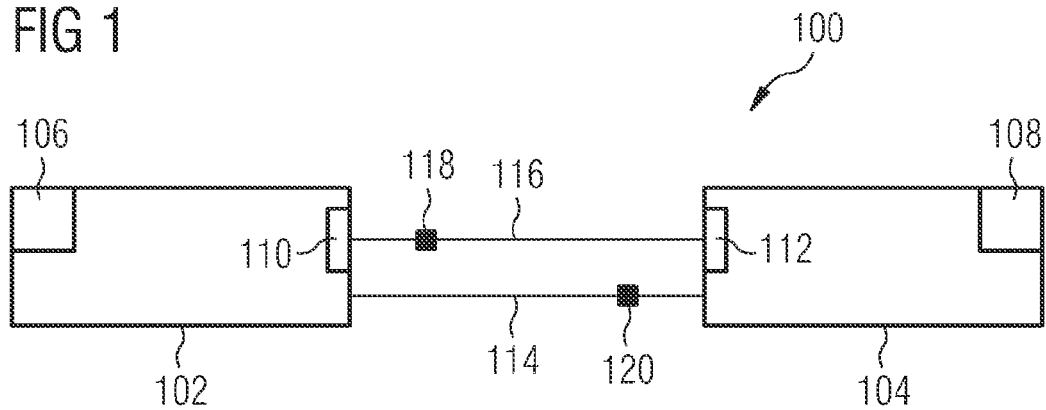
FIG. 1 shows concerned nodes of a mobile network according to embodiments of the herein disclosed subject matter.
FIG. 2 shows the transport bandwidth required for handling a number NoC of simultaneous speech calls.
FIG. 3 shows the transport bandwidth required for handling a number NoC of simultaneous speech calls with RTP multiplexing.
FIG. 4 shows the transport bandwidth required for handling a number NoC of simultaneous speech calls with RTP multiplexing and header compression.

The illustration in the drawings is schematic. It is noted that in different figures, similar or identical elements are provided with the same reference signs or with reference signs, which are different from the corresponding reference signs only within the first digit or an appended character. Repeated description of such similar or identical elements is omitted.

FIG. 1 schematically shows part of mobile network 100 which serves to explain basic functionality of the herein disclosed subject matter.

The mobile network 100 includes a plurality of network nodes, two of which, namely a first network node 102 and a second network node 104, are shown in FIG. 1. Each of the network nodes 102, 104 comprises a control unit 106, 108 for carrying out respective methods in order to provide the functionality according to aspects, embodiments and examples of the herein disclosed subject matter. Further, each network node 102, 104 comprises at least one interface 110, 112 for communicating with other nodes 104, 102 of the mobile network 100. One such interface 110, 112 per network node 102, 104 is exemplarily shown in FIG. 1. The term interface includes physical devices as well as logical device, e.g. interfaces which are modelled in software. The mobile network 100 provides a user plane 114 for transporting transmission packets, which contain user data, and at least one additional further network layer plane 116 different from the user plane 114. In FIG. 1 the interfaces 110, 112 are associated with the further network layer plane 116. For the user plane 114, there may also be provided respective interfaces and protocols (not shown in FIG. 1).

The control unit 106 of the first network node 102 is configured for providing the functionality of sending an information element 118 to the second network node 104 via a network layer protocol of said further network layer plane 116. The information element 118 indicates optimizing capabilities of the first network node 102, e.g. the capability of the first network node 102 of processing an optimized transmission packet 120. According to an embodiment, the transmission packet 120 is transmitted via the user plane to the first network node 102.

The control unit 108 of the second network node 104 is configured for providing the functionality of receiving the information element 118 from a first network node 102 via the network layer protocol of said further network layer plane 116, wherein the information element indicates an optimizing capability of said first network node 102 of processing an optimized transmission packet 120. Further, the control unit is configured for providing the functionality of processing said information element 118.

Herein the feature that the control unit 106, 108 is configured to provide a certain functionality also includes cases where the control unit is configured to provide the functionality alone or by interacting with further components of the respective network node 102, 104.

In the following, further exemplary embodiments of the herein disclosed subject matter will be described. In the course of the following description also disadvantages of known systems that became apparent to the inventors when having knowledge of the herein disclosed subject matter are briefly discussed.

In the following, some embodiments are related to the use of IP/Ethernet transport within the UMTS Radio Access Network (UTRAN), while other embodiments are related to the need to multiplex small data packets, i.e. small Packet Data Units (PDUs), into the same IP packet in order to minimise the overhead and optimise transport resources. Some embodiments relate to method for negotiating data multiplexing over RAN line interfaces.

Mobile operators are more and more considering migration towards an IP transport for reducing the costs of operation and deployment. Yet, if on the one hand IP offers more flexible and cost efficient transport solutions respect to the legacy TDM/ATM technologies, on the other hand the introduced additional overhead coming from the IP/Ethernet headers as well as from security mechanisms (e.g. Ipsec), which can be devised for protecting the system from malicious attacks, may be not negligible. This is particularly the case for short packets where the overhead can fairly exceeded the data payload.

Situation becomes even more critical for indoor radio access applications (named home(evolved)NodeB applications within 3GPP), intended to bring mobile radio coverage inside the customer's premises using so called home transceiver stations or femto access points (FAPs). For such applications, FAP will be directly assigned to the end user and directly installed in his home environment. FAP will be generally connected to the transport network via a DSL WAN router, offering both mobile and fixed network services. An important point to consider is that bandwidth from a (A)DSL line can be very limited, especially for the uplink direction. Often only few hundred kilobit per second (Kbps) are actually available, not sufficient for carrying multiple parallel calls. For such indoor applications, situation is further made worse by the use of security protection mechanisms (e.g. IPsec) generally devised for transferring signalling and data on the DSL lines, introducing additional overheads.

Within 3GPP there has been described a solution for performing PDU multiplexing for packets directed to the same IP address termination and having the same quality of service requirements (see 3GPP TR 29.814 V7.1.0. (2007 June), 3GPP TS 29.414 V8.2.0 (2008 December)). Hence a method for multiplexing small data units in single IP packets may use the concept of "UDP multiplex header". This method has been specifically intended for circuit switched (CS) PDUs delivered over the Iu interface (only) via the Real Time Protocol (RTP).

The table in FIG. 2 shows the transport bandwidth required for handling a number NoC of simultaneous speech calls (AMR 12.2 kbps) at a Femto Access Point over an ADSL link using IPsec and PPP over Ethernet over ATM. The example refers to the case where no PDU multiplexing applies. Shown are maximum data rates in kilobit per second (kbps) for parallel CS voice calls using standard RTP. As it is apparent from the table in FIG. 2, it is not possible to handle four simultaneous speech calls, when the ADSL line offers a (typical) bandwidth of 256 kbps.

The tables in FIG. 3 and FIG. 4 report the transport bandwidth required for the same scenario as for table in FIG. 2, when RTP multiplexing without header compression (FIG. 3) and with header compression (FIG. 4) respectively are used, according to 3GPP indications (see 3GPP TS 29.414 V8.2.0 (2008 December) and TR 29.814 V7.1.0. (2007 June)).

Negotiation is needed in order to take into account legacy networks, where either or both of the network nodes (peers) may be not able to support the feature. From 3GPP TS 29.414 V8.2.0 (2008 December) and TR 29.814 V7.1.0. (2007-06) the following two negotiation protocols are suggested by these documents:
1. negotiation via Iu user plane protocol
2. negotiation via Real time control protocol (RTCP) protocol In the following proposed embodiments of the herein disclosed subject matter, alternative ways for negotiating packet multiplexing are described, solving at least part of the drawbacks of the known methods.

Both proposed protocols have strong limitations and drawbacks as discussed below. Common to both protocols is that they all apply only to CS PDUs using Real Time Protocol (RTP). Having regard to RTP it is important to recognize that the RTCP protocol messages can be exchanged only after the associated RTP session is already active, therefore the multiplexing capability negotiation and port exchange would have to be done when the RTP connection is already ongoing. This reduces to some extent the advantages of the multiplexing scheme and adds additional complexity on the HNB-GW side. A further common feature of both proposed protocols is that they only address the Iu interface. Yet, other line interfaces exist in a radio access network (e.g. the Iub and the Iur interfaces in the RAN, the S1 in the eUTRAN) which can use IP and may require transport bandwidth optimisation. However, an advantage of both proposed protocols is that there is perfect synchronisation between the two network nodes as for the point in time when the feature is activated. This is due to in-band negotiation.

The inventors have gained the following view of the Iu user plane protocol (see e.g. 3GPP TS 25.415 V8.0.0 (2008 December)). The proposal according to this document is to enhance the initialisation messages & procedure of the Iu user plane protocol in support mode of operation.

User plane protocol is only defined at the Iu Interface. In contrast, embodiments of the herein disclosed subject matter allow PDU multiplexing negotiation over other line interfaces of the RAN.

Iu user plane Protocol is RAB specific, i.e. each CS RAB in support mode can exchange with the network node dedicated Iu user plane protocol messages. Yet, PDU multiplexing addresses multiple RABs. Such signalling does not allow to discriminate the RABs to be included/excluded from the multiplexing; actually all CS speech RABs between the two network nodes will be equally affected.

In contrast, embodiments of the herein disclosed subject matter allow selecting some RABs for multiplexing, e.g. according to different QoS handling requirements. Besides, RAB establishment and/or respective Initialisation procedure can fail. According to an embodiment of the herein disclosed subject matter, the negotiation protocol should be common to all addressed RABs, rather than RAB specific.

User plane signalling follows the same transport path of the user data/RAB. It does not benefit of lower layer retransmission mechanisms (e.g. those offered by SCTP protocol) and may suffer of bad quality. This can delay the activation of the feature.

The user plane protocol is often terminated in another network entity (e.g. MediaGateWay (MGW)) respect to the Core (e.g. MSC). This implies that the Core may not be aware whether multiplexing is actually running and for which direction (uplink or downlink or both). CN will be not able to do correct call admission control (CAC) for the new RABs, unless MGW signals (e.g. via IPBCP) to the Core the contracted mode. The former case is inefficient, the latter requires additional signalling.

Multiplexing affects the transport bandwidth utilisation. It is therefore recommended that the transport plane be informed in order to properly count for the used transport resources (CAC) as well as used ports (e.g. UDP ports used or released from the Common header). This implies a communication across the planes which may not be always present. Note that such communication can be real time as far as possible, for avoiding resource conflict situations.

The initialisation procedure generally runs only once at RAB establishment to configure both termination points of the Iu User plane with RAB sub-flows combinations and associated RAB sub-flows Service Data Units (SDUs) sizes to be supported during the user data transfer. Yet, there may be the need to activate/deactivate RAB multiplexing during the RAB life time. For the purpose, a dedicated new user plane procedure can better fit.

Advantages of the user plane protocol are that the Iu user plane protocol is supported by every 3G equipment over the Iu interface. The multiplexing negotiation is done in band; this actually means that the involved entities (e.g. the MGW) are directly informed of when and how the multiplexing feature is activated Regarding the RTCP Protocol (RFC 3550 "RTP: a transport Protocol for Real Rime applications") the inventors have gained to following. Proposal is to enhance Real Time Control Protocol (RTCP) messages and procedures. RTCP is paired with the RTP used for the RAB.

RTCP support is optional in the 3G Radio Access Networks. It may therefore not always be supported by a network node.

RTCP protocol applies only to CS RABs. On the other hand, it applies to all CS RABs (so also to Video calls; contrary to the Iu user plane protocol) and to all line interfaces of the RAN supporting it.

RTCP protocol is RAB specific, i.e. each RAB has each own RTCP protocol. It is not well suited to address multiple RABs.

RTCP protocol follows the same path as the RTP protocol/associated RAB. It does not benefit of lower layer retransmission services.

RTCP and RTP terminate at the same point. The Core may not be aware of the contracted mode.

Multiplexing affects the transport resource utilisation. Interaction between user plane and transport plane would be required- RTCP message should be not sent very often. This can further delay the activation of this feature and the synchronisation between the two network nodes.

Advantage is that RTCP protocol is currently already used over the Nb interface between MGWs for exchanging speech frames.

Advantage of the RTCP protocol is that it allows in band negotiation.

In the following, embodiments of an alternative solution are described having the at least some of the advantages of RTCP, without most of its drawbacks.

The idea of further embodiments of the herein disclosed subject matter is to use the Radio Network Layer (RNL) protocol on affected interfaces (e.g. Iu/Iub/Iur/Iuh/S1) for exchanging data multiplexing capabilities between two network nodes (network nodes), as well as common ports for the multiplexed stream and activation and deactivation commands. Having regard to the basic picture of a mobile network 100 in FIG. 1, this means that the interfaces 110, 112 are one of an Iuh, S1, Iu, Iub, or Iur interface in some embodiments. In a 3G radio access network (RAN) this would correspond respectively to the RANAP protocol on the Iuh, Iu interface; NBAP on the Iub and the RNSAP protocol on the Iur interface. Accordingly in a 4G network this would correspond to at least S1 interface between eNB/HeNB and MME.

Regarding the Iu interface (3GPP TS 25.413 V8.1.0 (2008 December)), the following enhancements to RANAP messages and procedures are suggested:

Messages:

The initiator (e.g. the Core, MSC or SGSN or GateWay in femto application) announces and activates its multiplexing capabilities using a new optional information element IE, e.g. Multiplexing Capability IE, in the following RANAP or S1AP messages:

RANAP: RAB ASSIGNMENT REQUEST (for the new RABs or for RABs to modify)
RANAP: RELOCATION REQUEST
S1AP: INITIAL CONTEXT SETUP REQUEST
S1AP: E-RAB SETUP REQUEST
S1AP: HANDOVER REQUEST The responder (e.g. the RAN entity, RNC; the eRAN entitiy H(e)NB; the femto GW or FAP in a femto application) announces and activates its multiplexing capabilities using the same new IE in the following RANAP or S1AP messages:

RANAP: RAB ASSIGNMENT RESPONSE (for the RABs successfully established or modified)
RANAP: RELOCATION REQUEST ACKNOWLEDGE (for the RABs successfully established)
S1AP: INITIAL CONTEXT SETUP RESPONSE
S1AP: E-RAB SETUP RESPONSE
S1AP: HANDOVER RESPONSE In the above cases, a new IE according to embodiments shown in FIG. 5 may be used, providing a choice of multiplexing capability. According to an embodiment shown in FIG. 5, the information element comprises a field "mux announcement" and an associated field "common multiplexing port". According to another embodiment shown in FIG. 5, for activating/deactivating of mulitplexing, a "mux activation" field with associated "common multiplexing port" is provided the IE.

Procedures:
Step 1:

When establishing the first RAB towards a RAN (or a femto GW or a FAP) via RANAP: RAB ASSIGNMENT REQUEST or via S1AP: INITIAL UE CONTEXT SETUP REQUEST or S1AP: E-RAB SETUP REQUEST, the initiator declares its multiplexing capabilities via the "Mux Announcement choice" field. At this stage it can optionally indicate the common port assigned locally when and if multiplexing will be eventually activated.

The responder will reply with a RANAP: RAB ASSIGNMENT RESPONSE, or an S1AP: INITIAL UE CONTEXT SETUP RESPONSE, or S1AP: E-RAB SETUP RESPONSE, declaring its multiplexing capabilities via the "Mux Activation choice" field. At this stage it can optionally indicate the common port assigned locally when and if multiplexing will be eventually activated.

After Step1, both network nodes (peers) know their respective multiplexing capabilities.

This step can be skipped, and possibly also the "Mux Announcement Choice" field from the new IE, if the two network nodes already know (e.g. via O&M configuration) their respective multiplexing capabilities.

Step 2:

When establishing subsequent RABs, or when modifying established ones, the initiator can request the activation of the selected multiplexing functionality via the "Mux Activation choice" field. The selected activation choice shall comply with the respective capabilities mutually declared by the two network nodes during the announcement phase: e.g. if core can support multiplexing uplink and downlink with Header compression whereas the RNC can only support downlink multiplexing without header compression, the selected choice would be "Start Transmission without Header Compression". At this stage it shall also indicate the common port assigned for multiplexing. If this field is used for deactivating an already established multiplexed stream, the common port can help the identification of the selected stream.

According to an embodiment, there are made two assumptions:

All RABs already established with the same announced common ports (source and destination) pair as the one requested now for activation will be automatically multiplexed together according to the activated configuration. This solution implies that signalling dedicated to one UE context also affects RABs of other UE contexts Only the RABs listed in this very RANAP or S1AP message will be multiplexed according to the activation indication. Other established RABs can join the same multiplexed stream only via explicit command, i.e. via other RANAP: RAB ASSIGNMENT REQUEST or via S1AP: E-RAB MODIFY REQUEST or S1AP: UE CONTEXT MODIFICATION REQUEST messages listing these RABs in the RABs to be modified item IE via the "Mux Activation choice" field. Number of additional RANAP or S1 messages to send will be equal to the number of active UE contexts having RABs wished to be added to this same multiplexed stream. This solution implies that signalling dedicated to one UE context only affects RABs of that context. The advantage of this solution is that it is possible to control which RABs multiplex together (e.g. according to the respective quality of service).

Step 3:

The deactivation of an established multiplexing stream can be done sending a RAB: ASSIGNMENT REQUEST message for the UE context having RABs wished to be moved out, listing these RABs in the RABs to be Modified Item IE and via the appropriate ("stop") "Mux Activation choice" field value or via S1AP: UE CONTEXT MODIFICATION REQUEST or S1AP: E-RAB MODIFY REQUEST.

Having regard to the Iub interface (3GPP TS 25.433 V8.3.0 (2008 December)), similar changes as suggested above for the Iu interface apply here. In particular:

Messages:

The initiation (e.g. the RNC) announces and activates its multiplexing capabilities using a new optional information element, e.g. Multiplexing Capability IE, in the following NBAP messages:
  NBAP: RADIO LINK SETUP REQUEST
  NBAP: RADIO LINK ADDITION REQUEST
  NBAP: RADIO LINK RECONFIGURATION PREPARE
  NBAP: RADIO LINK RECONFIGURATION REQUEST The responder (e.g. NodeB) announces and activates its multiplexing capabilities using the same new IE in the following NBAP messages:
  NBAP: RADIO LINK SETUP RESPONSE
  NBAP: RADIO LINK SETUP FAILURE (for the successfully established bearers)
  NBAP: RADIO LINK ADDITION RESPONSE
  NBAP: RADIO LINK ADDITION FAILURE (for the successfully established bearers)
  NBAP: RADIO LINK RECONFIGURATION READY
  NBAP: RADIO LINK RECONFIGURATION RESPONSE Coding of the new IE can be for example according to one or more of the embodiments shown in the table in FIG. 5 and described with regard to the Iu interface.

Procedures:

Step 1:

When establishing the first dedicated radio link towards the responder (NodeB) via NBAP: RADIO LINK SETUP REQUEST, the initiator (RNC) declares its multiplexing capabilities via the "Mux Announcement choice" field. At this stage it can optionally include the common port assigned when and if multiplexing will be eventually activated.

The responder will reply with an NBAP: RADIO LINK SETUP RESPONSE message, declaring its multiplexing capabilities via the "Mux Activation choice" field. At this stage it can optionally include the common port assigned when and if multiplexing will be eventually activated.

After step 1, both network nodes know their respective multiplexing capabilities.

This step can be skipped, and therefore also the "Mux Announcement Choice" field from the new IE, if the two network nodes already know (e.g. via O&M configuration) their respective multiplexing capabilities.

Step 2:

When establishing subsequent links, or when reconfiguring established ones, the initiator (RNC) can request the activation of the selected multiplexing functionality via the "Mux Activation choice" field. The selected activation choice shall comply with the respective capabilities mutually declared by the two network nodes during the announcement phase. At this stage it shall also indicate the common port assigned for multiplexing. If this field is used for deactivating an already established multiplexed stream, the common port can help the identification of the selected stream.

According to an embodiment, two assumptions are made:
a) All Radio links already established with the same announced common ports (source and destination) pair as the one requested now for activation will be automatically multiplexed together according to the activated configuration.
b) Only the radio links listed in this very NBAP message will be multiplexed according to the activation indication. Other established radio links can join the same multiplexed stream only via explicit command i.e. via NBAP: RADIO LINK RECONFIGURATION REQUEST/PREPARE messages listing the radio links for which the start "Mux Activation choice" field applies. Number of additional RADIO LINK RECONFIGURATION REQUEST/PREPARE messages to send will be equal to the number of active contexts having radio links wished to be added to this same multiplexing stream.

Note that the RADIO LINK RECONFIGURATION PREPARE message allows achieving synchronised multiplexing of the affected radio links.

Step 3:

The deactivation of an established multiplexing stream can be done sending an NBAP: RADIO LINK RECONFIGURATION REQUEST/PREPARE messages for the contexts having radio links wished to be moved out, listing these radio links for which the stop "Mux Activation choice" field applies.

Regarding the Iur interface (3GPP TS 25.423 V8.3.0 (2008 December)) Similar changes as suggested for the Iub interface apply here. In particular:

Messages:

The initiator (e.g. Source RNC; S-RNC) announces and activates its multiplexing capabilities using a new optional information element, e.g. Multiplexing Capability IE, in the following RNSAP messages:
  RNSAP: RADIO LINK SETUP REQUEST
  RNSAP: RADIO LINK ADDITION REQUEST
  RNSAP: RADIO LINK RECONFIGURATION PREPARE
  RNSAP: RADIO LINK RECONFIGURATION REQUEST The responder (e.g. Target RNC; T-RNC) announces and activates its multiplexing capabilities using the same new IE in the following RNSAP messages:
  RNSAP: RADIO LINK SETUP RESPONSE
  RNSAP: RADIO LINK SETUP FAILURE (for the successfully established bearers)
  RNSAP: RADIO LINK ADDITION RESPONSE
  RNSAP: RADIO LINK ADDITION FAILURE (for the successfully established bearers)
  RNSAP: RADIO LINK RECONFIGURATION READY
  RNSAP: RADIO LINK RECONFIGURATION RESPONSE Coding of the new IE can be for example according to one or more of the embodiments shown in the table in FIG. 5 and described with regard to the Iu interface.

Procedures:

Step 1:

When establishing the first dedicated radio link towards a responder (T-RNC) via RNSAP: RADIO LINK SETUP REQUEST, the initiator (S-RNC) declares its multiplexing capabilities via the "Mux Announcement choice" field. At this stage it can optionally include the common port assigned when and if multiplexing will be eventually activated.

The responder (T-RNC) will reply with an RNSAP: RADIO LINK SETUP RESPONSE message, declaring its multiplexing capabilities via the "Mux Activation choice" field. At this stage it can optionally include the common port assigned when and if multiplexing will be eventually activated.

After Step 1, both network nodes know their respective multiplexing capabilities.

This step can be skipped, and therefore also the "Mux Announcement" choice from the new IE, if the two network nodes already know (e.g. via O&M configuration) their respective multiplexing capabilities.

Step 2:

When establishing subsequent links, or when reconfiguring established ones, the initiator (S-RNC) can request the activation of the selected multiplexing functionality via the "Mux Activation choice" field. The selected activation choice shall comply with the respective capabilities mutually declared by the two network nodes during the announcement phase. At this stage it shall also indicate the common port assigned for multiplexing. If this field is used for deactivating an already established multiplexed stream, the common port can help the identification of the selected stream.

According to an embodiment, two assumptions are made:
a) All radio links already established with the same announced common ports (source and destination) pair as the one requested now for activation will be automatically multiplexed together according to the activated configuration
b) Only the radio links listed in this very RNSAP message will be multiplexed according to the activation indication. Other established radio links can join the same multiplexed stream only via explicit command, i.e. via RNSAP: RADIO LINK RECONFIGURATION REQUEST/PREPARE messages listing the radio links for which the start "Mux Activation choice" field applies. Number of additional RADIO LINK RECONFIGURATION REQUEST/PREPARE messages to send is equal to the number of active contexts having radio links wished to be added to this same multiplexing stream.

The RADIO LINK RECONFIGURATION PREPARE message allows achieving synchronised multiplexing of the affected radio links.

Step 3:

The deactivation of an established multiplexing stream can be done sending a RNSAP: RADIO LINK RECONFIGURATION REQUEST/PREPARE messages for the contexts having radio links wished to be moved out, listing these radio links for which the Mux Activation choice applies.

In the above described embodiments the use of the Radio Network Layer (RNL) protocol on Iu/Iub/Iur interfaces for exchanging data multiplexing capabilities between two network nodes (peers) has been described. Advantages of these embodiments are as follows:

Every legacy core and radio access network (RAN) element supports the radio network layer protocol. The above described embodiments propose to add optional information elements in existing messages. On the other hand, RTCP support is optional.

Embodiments of the herein disclosed subject matter allow PDU multiplexing on every line interface of the RAN and for every kind of traffic, CS and PS.

RNL benefits of the retransmission mechanisms of the transport protocols beneath.

It is possible to select which data stream to multiplex, which data stream to remove from the multiplex.

It allows to create separate multiplexed streams, e.g. arranged based on the traffic QoS/transport requirement Extension/enhancement of the RNL protocol can be fully handled within 3GPP.

In the following, further exemplary embodiments relating to exchanging multiplex-related information between home nodeB and home nodeB Gateway are described.

Figure 6:
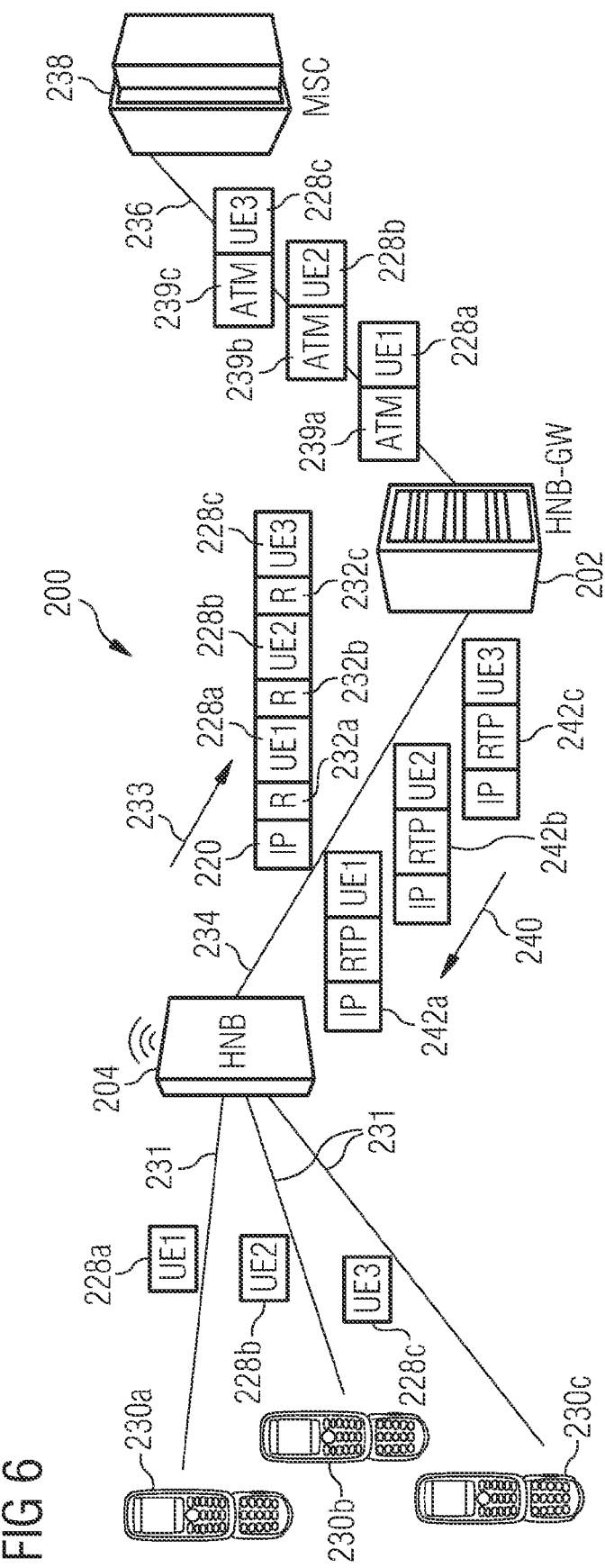
FIG. 6 shows a mobile network according to embodiments of the herein disclosed subject matter.

The embodiments described below are related to the femto concept, present in the radio communication technology field. As already briefly explained above, the main aim of femto technology is to introduce at customer premises a simplified and inexpensive radio access point (HNB—home nodeB) using the cellular technology used also by operator in manner that would be beneficial for both sides. The connection of HNB to the cellular operator network at HNB GW (HNB gateway) is done via third-party fixed line. Typically an unbalanced bandwidth technology is used in last mile access (uplink capacity is much smaller than downlink one), such as ADSL. The bandwidth consumption on the voice service is quite high because several packet-switched protocols used there introduce significant overhead for each voice packet transmitted. One voice connection generates up to 84.8 kbit/s stream at physical level when using the AMR codec. If there are more simultaneous calls the value is multiplied accordingly. In a typical HNB implementation a maximum of 4 voice calls is supported, generating up to 340 kbit/s stream at physical level, and, as described above, this value exceeds the possibilities of the average basic offerings of fixed line Internet providers (256 kbit/s in the uplink). In order to overcome the uplink bandwidth limitation, the HNB can multiplex the uplink voice packets from different terminals (UE—User Equipment) into a single IP packet containing multiple RTP frames, which is being sent to the HNB Gateway. The RTP header can be additionally compressed to further reduce the occupied bandwidth. The speech frames are de-multiplexed by the HNB-GW to ensure backward compatibility with legacy core network mobile switching center (MSC). The principle of such a mobile network in the form of a femto cell solution is shown in FIG. 6. The mobile network 200 in FIG. 6 illustrates the principle of uplink bundling for Iuh-to-Iu based femto cell solution.

Voice frames, indicated at 228a, 228b, 228c in FIG. 6, arrive at the home nodeB (HNB) 204 from multiple terminals 230a, 230b, 230c (UE—User Equipment) over an air interface 231. The HNB 204 buffers all voice frames 228a, 228b, 228c until that from the last active terminal has arrived, and thereafter creates an IP packet 220 where a (compressed) RTP header 232a, 232b, 232c is added to each voice frame 228a, 228b, 228c and they are concatenated one after the other, e.g. according to the principles already defined for the Nb-interface (3GPP TS 29.414 V8.2.0 (2008 December)). The IP packet 220 is thereafter sent in uplink direction 233 over the IPsec tunnel 234 set up between the HNB 204 and the HNB Gateway 202 to provide integrity and confidentiality for HNB to HNB-GW communication. Once the IP packet 220 arrives at the HNB-GW 202 it is decrypted and the speech frames 228a, 228b, 228c are de-multiplexed. When sending the speech frames to the mobile switching center MSC 238 over the Iu-CS interface 236, there is a single speech frame 228a, 228b, 228c per ATM packet 239a, 239b, 239c (or RTP packet). From a RNL perspective the interface between 204 and 202 is also referred to as Iuh interface as from a RNL perspective the IPsec tunnel 234 is not essential.

According to an embodiment, speech frame bundling is not performed for downlink (in downlink direction 240, from the HNB-GW 202 to the HNB 204), e.g. when the available bandwidth is considered sufficient.

Hence, in such a case the IP packets 242a, 242b, 242c sent in downlink direction are not multiplexed in this embodiment.

In order to apply the multiplexing and compression mechanism, it is necessary to exchange some information between the participating network nodes prior or at the start of the actual communication session.

The embodiments described in the following are based on the idea of exchanging compression- and multiplexing-related information before the packets carrying voice samples related to calls are being exchanged between the HNB and HNB-GW in a procedure, completely unrelated to the signalling for setting up of the voice calls.

In accordance with an embodiment, it is proposed to signal the ability of HNB GW to support multiplexing and the specific MUX UDP port during the initial establishment of HNB and HNB GW communication (eg. during registration of the HNB at the HNB-GW (see 3GPP TS 25.469 V8.0.0 (2008 December))).

In accordance with a further embodiment, it is proposed to signal the ability of HNB GW to support multiplexing and the specific MUX UDP port during parameterization of the HNB using TR-069 (see 3GPP TS 25.467) even before communication between HNB and the HNB-GW starts. To exchange this kind of information, appropriate enhancements to existing protocols and/or data models need to be introduced as described in the following sections.

The HNB-GW needs to inform the HNB about its capability to support RTP frames multiplexing, its capability to support RTP header compression. and its local UDP port used to receive multiplexed RTP streams to allow the use of multiplexing in the uplink (HNB to HNB-GW).

As long as multiplexing/compression is not to take place in the downlink, the HNB does not need to inform the HNB-GW about its local UDP multiplex port.

According to another embodiment, the HNB does not inform explicitly the HNB-GW about its support of the multiplexing and compression. Rather, the support of these features is done in an implicit way in this embodiment.

Upon the reception of the information that the multiplexing/compression is supported by the HNB-GW, the HNB may decide to apply the multiplexing/compression in the voice connections, and, according to an embodiment, it does so by sending the multiplexed packets to the given MUX UDP port (implicitly signalling that it supports multiplexing).

According to an embodiment, a flag is provided in an RTP header for allowing the HNB to indicate that the HNB wishes to apply the compression. For example, if the HNB wishes to apply the compression, it indicates it by raising an appropriate flag in the multiplex RTP header (thus implicitly indicating that it supports the compression), as stated in 3GPP TS 29.414 V8.2.0 (2008 December)).

If these functions are not supported by the HNB-GW, it does never send the appropriate message to the HNB. Receiving no such a message the HNB would assume, according to an embodiment, that the HNB-GW does not support the multiplexing/compression and therefore would never apply it in the uplink transmission.

In the following further exemplary embodiments of the herein disclosed subject matter are described.

According to an embodiment of the methods of operating the HNB-GW (first network node) and the HNB (second network node) are based on the use of HNBAP protocol (3GPP TS 25.469 V8.0.0 (2008 December)). When HNB is connected to the network it must register to chosen HNB-GW. There is a specific procedure defined in HNBAP, a respectively adapted version of which is shown in FIG. 7. In the mobile network 200 in FIG. 7, the HNB 204 exchanges registration messages with the HBN-GW 202. To implement the early information about the multiplexing/compression according to embodiment, the messages of this procedure need to convey the additional new information element(s) (IE), e.g. according to an embodiment:

1. a MUX UDP port IE binary (16 bit—field)
2. a Compression support IE (Boolean type)

In the case of uplink multiplex support, the implementation is needed in HNB REGISTER ACCEPT message 250, which is sent from HNB-GW to HNB as response to a HNB REGISTER REQUEST message 252, as mandatory or optional IEs, the correct interpretation of the message is ensured by ASN.1 message definition constriction setting the priority to "Ignore if unknown IE" so backward compatibility is guaranteed.

In case of additional downlink multiplex/compression support, the enhancements as described before are also needed in HNB REGISTER REQUEST 252 to inform the HNB-GW about the HNB capabilities with respect to multiplexing/compression.

FIG. 8 illustrates the use of a data object model according to embodiments of the herein disclosed subject matter showing part of mobile network 300. According to an embodiment, of the methods of operating the HNB-GW (first network node in an embodiment) and the HNB (second network node in an embodiment) are based on the use of the administration channel from the HNB to network O&M, e.g. based on TR-069 protocol. According to an embodiment, this protocol is used when configuration parameters are communicated between O&M subsystem 360 and HNB 304 in a configuration download or configuration message 362. In an exemplary embodiment shown in FIG. 8, the O&M subsystem comprises a home nodeB management system (HMS) 360a and a operation and maintenance system (OMS) 360b. The HMS 360a has stored therein e.g. a femto access configuration data model. The OMS 360b may have stored therein configuration data models etc. for e.g. CS, HNB's and HNB gateways. According to an embodiment, the parameters are described in an "data object model" that is used by TR-069 protocol to set the parameters to the desired values. According to an embodiment, the parameters that are added to the data object model are:
1. MUX UDP port
2. Compression support There is a proposal (WT-196) for a "Femto Access Point Service Data model" jointly developed by 3GPP RAN WG3 and BroadBand Forum to enhance applicability of TR-069 protocol to make it useful for femto application. There is a definition of an object related to Iuh-FAPService.{i}.CellConfig.UMTS.RAN.Iuh. This object can be used to store the MUX UDP port.

Generally the method wherein the optimizing (multiplexing) capabilities are communicated to a second node via a configuration message is independent from the method relating to the registration process as described above with regard to FIG. 7.

According to embodiments of the invention, any component of the network nodes, e.g. the control units, interfaces or protocols are provided in the form of respective computer program products which enable a processor to provide the functionality of the respective elements as disclosed herein. According to other embodiments, any component of the network nodes may be provided in hardware. According to other—mixed—embodiments, some components may be provided in software while other components are provided in hardware.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

It is described a mobile network with a first network node and a second network node, the mobile network providing a user plane for transporting transmission packets, which contain user data, and a further network layer plane different from the user plane. A method of operating the first network node comprises sending an information element to a second network node via a network layer protocol of the further network layer plane wherein the information element indicates optimizing capabilities of the first network node or of a other network node of the mobile of processing an optimized transmission packet. A method of operating a second network node comprises receiving the information element from the first network node via a network layer protocol of the further network layer plane, and processing the information element.

Optimization activation in the first network node can be performed by an explicit activation message or by simply sending optimized transmission packets to the first network node, i.e. by starting optimized transmission.

Exemplary embodiments of the herein disclosed subject matter include:

using a protocol in HNB separate from user data transmission and unrelated to (voice) call-setup signalling to exchange packet multiplexing capabilities and packet compression capabilities before actual user data transmission starts.

node1 which is able to receive multiplexed and/or compressed RTP packets (eg., HNB-GW) announces its capability to the node2 (eg., HNB) including the multiplexing destination during HNB registration procedure which connects both nodes (eg HNB and HNB-GW via HNB Register Accept);

node2 (eg. HNB) receives the multiplexing and compression information (capability, UDP port) of node1 via an administration protocol (eg TR069 from O&M subsystem of HNB)

node2 accepts and activates the multiplexing and/or compression operation without further signalling just by sending a multiplexed and optionally compressed RTP packet to the previously indicated destination (UDP port dedicated to receive multiplexed RTP packets); RTP header compression operation is activated in-band and separately from multiplexing operation. The procedure how to activate RTP header compression is adopted from 29.414 and from RFC3550 and not part of invention.

HNB, HNB-GW: each node uses signalling protocol to exchange multiplexing capabilities and compression capabilities before actually starting user data transmission (CS or PS traffic or both). Multiplexing of user data packets starts and stops without any further negotiation procedure, just by sending packets to the appropriate destination ports.

introduction of new information elements into the Iu-h signalling protocols related to the transmission optimisation via multiplexing and packet compression Standardised data object model used by TR-069 for Femto application introduces information allowing multiplexing and compression of user data transmission on Iuh interface using radio network layer signalling protocol between peers connected via a RAN interface (i.e., S1-, Iu-, Iub-, Iur, Iu-h-interfaces) to exchange data multiplexing capabilities, activation and deactivation commands and common ports used for multiplexed data transmission HNB, HNB-GW, Base Station, Radio Network Controller: each node uses radio network layer signalling protocol to exchange multiplexing capabilities, inform about start and stop of multiplexing of a user data, and connection, flow and transmission of packets introduction of new information elements into the S1-, Iu- Iub-, Iur- Iu-h signalling protocols related to the transmission optimisation e.g. via multiplexing Advantages of embodiments of the herein disclosed subject matter are:

each node already supports the signalling protocol and new feature can easily be introduced by additional optional information elements in the protocol RTP compression negotiations according to already standardised procedure instead of new negotiation procedure (one) capability negotiation procedure between two nodes instead of exchange for each stream each RAN node already supports the respective signalling protocol and new feature can easily be introduced by additional optional Information Elements in the protocol support of PDU multiplexing on all interface in RAN (not just Iu-interface) and for CS and PS type of traffic (not just CS-voice traffic)

benefits from retransmission mechanism of deployed transport protocols for signalling packets in case of errors it is possible to create separate multiplexed streams (according to QoS/transport requirements), to select which data stream to multiplex, which data stream to remove from multiplex

LIST OF REFERENCE SIGNS

100, 200, 300 mobile network
102, 202 first network node
104, 204 second network node
106, 108 control unit
110, 112 interface
114 user plane
116 further network layer plane
118 information element
120, 220 transmission packet
228a, 228b, 228c voice frames
230a, 230b, 230c user equipment
231 air interface
232a, 232b, 232c RTP header
233 uplink direction
234 IPsec tunnel/Iuh interface
236 Iu-CS interface
238 mobile switching center (MSC)
239a, 239b, 239c asynchronous transfer mode (ATM) packet
240 downlink direction
242a, 242b, 242c IP packet
250 register accept message
252 register request message
304 second network node
360 operation & maintenance subsystem
360a home nodeB management system
360b operation & maintenance system
362 configuration message

The invention claimed is:

1. A method comprising:
   sending an information element from a first network node of a mobile network to a second network node, said mobile network providing a user plane for transporting transmission packets, said transmission packets containing user data, and at least one additional further network layer plane different from said user plane, said information element being sent via a network layer protocol of said further network layer plane, wherein the information element indicates optimizing capabilities of at least one of the first network node and the second network node of processing an optimized transmission packet.

2. The method according to claim 1, wherein said optimizing capabilities include multiplexing capabilities of said first network node of processing an optimized transmission packet containing different user data packets multiplexed into the optimized transmission packet.

3. The method according to claim 1, wherein sending an information element to said second network node is independent from a connection setup between said second network node and said first network node.

4. The method according to claim 1, further comprising:
   sending to the second network node a register accept message in response to a register request for connecting the second network node to the network, wherein said information element is contained in said register accept message.

5. The method according to claim 1, further comprising:
   sending to the second network node a control message, wherein said information element is contained in said control message.

6. The method according to claim 1, wherein the network layer protocol is a signalling protocol.

7. The method according to claim 1, wherein the further network layer plane is one of a control plane and an operation and maintenance plane.

8. The method according to claim 1, wherein the information element comprises a port specification specifying, of for the first network node, the port for receiving said optimized transmission packet.

9. A method comprising:
   receiving an information element from a first network node of a mobile network at a second network node, said mobile network providing a user plane for transporting transmission packets, said transmission packets containing user data, and at least one additional further network layer plane different from said user plane, said information element being sent via a network layer protocol of said further network layer plane; and
   processing said information element, wherein the information element indicates an optimizing capability of said first network node of processing an optimized transmission packet.

10. The method according to claim 9, wherein receiving said information element from said first network node is independent from a connection setup between said second network node and said first network node.

11. The method according to claim 9, further comprising:
    sending a optimization request message to said first network node, said optimization request message requesting the first network node to activate optimization and to send to the second network node optimized transmission packets.

12. The method according to claim 11, further comprising:
    sending to said first network node a resource assignment request message after said optimization request message, said resource assignment request message requesting the assignment of a respective resource for transmittance of transmission packets, wherein said resource assignment request message includes an optimization-choice information element requesting optimization for said requested resource.

13. The method according to claim 11, further comprising:
    sending to said first network node a resource modification request message after said optimization request message, said resource modification request message requesting the modification of a respective target resource, wherein said resource assignment request message includes an optimization-choice information element requesting deactivation of optimization for the target resource of said resource modification request message.

14. The method according to claim 9, wherein the network layer protocol is a signalling protocol.

15. The method according to claim 9, wherein the further network layer plane is one of a control plane and an operation and maintenance plane.

16. The method according to claim 9, wherein the information element comprises a port specification specifying, for the first network node, the port for receiving said optimized transmission packet.

17. A network node of a mobile network, said network node comprising:
   a control unit and an interface for communicating with other nodes of the mobile network, said control unit being configured to cause the network node to perform the following:
   send an information element from the network node to a further network node, said mobile network providing a user plane for transporting transmission packets, said transmission packets containing user data, and at least one additional further network layer plane different from said user plane, said information element being sent via a network layer protocol of said further network layer plane, wherein the information element indicates optimizing capabilities of at least one of the network node and the further network node of processing an optimized transmission packet.

18. Network node of a mobile network, said network node comprising:
   a control unit and an interface for communicating with other nodes of the mobile network, said control unit being configured to cause the network node to perform the following:
   receive an information element at the network node from a further network node, said mobile network providing a user plane for transporting transmission packets, said transmission packets containing user data, and at least one additional further network layer plane different from said user plane, said information element being sent via a network layer protocol of said further network layer plane; and
   process said information element, wherein the information element indicates optimizing capabilities of said further network node of processing an optimized transmission packet.

19. A processor configured to execute a computer program, the computer program enabling a network node to perform:
   sending an information element from a first network node of a mobile network to a further network node, said mobile network providing a user plane for transporting transmission packets, said transmission packets containing user data, and at least one additional further network layer plane different from said user plane, said information element being sent via a network layer protocol of said further network layer plane, wherein the information element indicates optimizing capabilities of at least one of the first network node and the further network node of processing an optimized transmission packet.

20. A processor configured to execute a computer program, the computer program enabling a network node to perform:
   receiving an information element at a network node of a mobile network from a further network node, said mobile network providing a user plane for transporting transmission packets, said transmission packets containing user data, and at least one additional further network layer plane different from said user plane, said information element being sent via a network layer protocol of said further network layer plane; and
   processing said information element, wherein the information element indicates optimizing capabilities of said further network node of processing an optimized transmission packet.

* * * * *